(12) United States Patent
Huang et al.

(10) Patent No.: US 12,434,507 B2
(45) Date of Patent: Oct. 7, 2025

(54) STRUCTURE FOR ASSEMBLING SNAP-ON CASTER OF DRAW-BAR CASE

(71) Applicant: Jerry Moon, Taipei (TW)

(72) Inventors: He Huang, Dongguan (CN); Liping Yuan, Dongguan (CN); Jerry Moon, Taipei (TW)

(73) Assignee: Jerry Moon, Taipei (TW)

( * ) Notice: Subject to any disclaimer, the term of this patent is extended or adjusted under 35 U.S.C. 154(b) by 0 days.

(21) Appl. No.: 18/632,752

(22) Filed: Apr. 11, 2024

(65) Prior Publication Data

US 2025/0128543 A1 Apr. 24, 2025

(30) Foreign Application Priority Data

Oct. 21, 2023 (CN) .......................... 202322827859.7

(51) Int. Cl.
*B60B 33/00* (2006.01)
*A45C 5/14* (2006.01)

(52) U.S. Cl.
CPC ............ *B60B 33/001* (2013.01); *A45C 5/143* (2013.01); *B60B 2200/45* (2013.01)

(58) Field of Classification Search
CPC ........... A45C 5/14; A45C 5/141; A45C 5/143; B60B 2200/45; B60B 33/001
USPC ............................................................ 16/29
See application file for complete search history.

(56) References Cited

U.S. PATENT DOCUMENTS

| | | | | |
|---|---|---|---|---|
| 4,335,896 A | * | 6/1982 | Koffler .................. | A45C 5/143 16/30 |
| 4,509,227 A | * | 4/1985 | Keane ..................... | A47L 9/009 15/327.2 |
| 4,719,663 A | * | 1/1988 | Termini .............. | B60B 33/0002 403/353 |
| 4,772,035 A | * | 9/1988 | Danial .................. | B62B 5/0083 280/47.32 |
| 4,817,237 A | * | 4/1989 | Murphy .............. | B60B 33/0002 16/257 |
| 5,361,454 A | * | 11/1994 | Sumser ..................... | B62B 7/06 301/111.06 |
| 5,365,635 A | * | 11/1994 | Jang .................... | B60B 33/0039 16/34 |

(Continued)

FOREIGN PATENT DOCUMENTS

EP      3595484 B1 *   2/2022     ............... A45C 5/14

*Primary Examiner* — Jeffrey O'Brien
(74) *Attorney, Agent, or Firm* — Rabin & Berdo, P.C.

(57) ABSTRACT

The present invention provides a structure for assembling a snap-on caster of a draw-bar case. The draw-bar case includes a case body and four caster assemblies. The caster assembly includes a caster and an upper positioning cover. The caster includes a mounting pedestal and a universal wheel. Four sides of the case body are each provided with an installation slot. Several insertion plates are disposed on an inner side surface of the upper positioning cover. The installation slot is penetrated to form a through hole that is disposed corresponding to the insertion plate. The installation pedestal is provided with a buckle plate that is disposed corresponding to the through hole. The buckle plate is penetrated to form an insertion hole. Both sides of one end of the insertion plate are each provided with an inverted buckle. The insertion plate is snap-fitted onto the insertion hole after passing through the through hole and the insertion hole sequentially.

3 Claims, 7 Drawing Sheets

(56) References Cited

U.S. PATENT DOCUMENTS

| | | | | |
|---|---|---|---|---|
| 5,575,361 A * | 11/1996 | Chou | A45C 13/262 | |
| | | | 280/37 | |
| 5,634,240 A * | 6/1997 | Brokaw | A45C 5/14 | |
| | | | 248/205.2 | |
| 6,193,324 B1 * | 2/2001 | Chang | B60B 33/0063 | |
| | | | 301/125 | |
| 6,293,569 B1 * | 9/2001 | Ferre | A45C 13/385 | |
| | | | 280/DIG. 3 | |
| 6,450,515 B1 * | 9/2002 | Guth | B60B 33/0002 | |
| | | | 280/47.32 | |
| 6,592,133 B2 * | 7/2003 | Powell | A45C 5/143 | |
| | | | 280/37 | |
| 7,100,236 B1 * | 9/2006 | Ji | B60B 33/0026 | |
| | | | 15/327.2 | |
| 7,165,290 B2 * | 1/2007 | Martinez | B60B 33/0026 | |
| | | | 280/47.32 | |
| 7,931,284 B2 * | 4/2011 | Chiu | B60B 33/0042 | |
| | | | 16/30 | |
| 8,783,431 B2 * | 7/2014 | Wu | A45C 5/143 | |
| | | | 16/30 | |
| 9,961,974 B2 * | 5/2018 | Hillaert | A45C 5/14 | |
| 10,112,366 B2 * | 10/2018 | Yu | B32B 27/36 | |
| 10,807,412 B1 * | 10/2020 | Ahearn | B60B 33/0026 | |
| 12,097,606 B2 * | 9/2024 | Caratiola | B25H 1/0014 | |
| 12,157,334 B2 * | 12/2024 | Qiu | B60B 33/0023 | |
| 2003/0094554 A1 * | 5/2003 | Bushey | B60B 33/001 | |
| | | | 248/346.11 | |
| 2004/0188201 A1 * | 9/2004 | Chuo | A45C 5/14 | |
| | | | 280/655 | |
| 2005/0015928 A1 * | 1/2005 | Arsenault | B60B 33/0039 | |
| | | | 16/300 | |
| 2014/0041978 A1 * | 2/2014 | Chang | A45C 5/02 | |
| | | | 190/107 | |
| 2020/0187609 A1 * | 6/2020 | Hillaert | B32B 3/263 | |
| 2020/0352299 A1 * | 11/2020 | Rubio | A45C 5/03 | |
| 2025/0127270 A1 * | 4/2025 | Huang | A45C 13/262 | |

\* cited by examiner

STRUCTURE FOR ASSEMBLING SNAP-ON CASTER OF DRAW-BAR CASE

FIELD OF THE INVENTION

The present invention relates to the technical field of draw-bar cases, and in particular to a structure for assembling a snap-on caster of a draw-bar case.

BACKGROUND OF THE INVENTION

A draw-bar case is a suitcase having a draw bar and casters and is widely used because of its ease of use. The casters of the existing draw-bar case are generally installed at the four sides of the bottom of the case body through screws. The installation process is cumbersome and the assembling efficiency is low, which restricts the improvement of production efficiency and requires a lot of manpower to assemble the casters, increasing the production cost.

SUMMARY OF THE INVENTION

The problem to be solved by the present invention is to provide a structure for assembling a snap-on caster of a draw-bar case, which reduces the difficulty of assembling the casters and improves the assembling efficiency.

To solve the aforementioned technical problems, the present invention provides a structure for assembling a snap-on caster of a draw-bar case, including a case body and four caster assemblies. The caster assemblies include a caster and an upper positioning cover. The caster includes an installation pedestal and a universal wheel disposed on the installation pedestal. Four sides of a bottom of the case body are each provided with an installation slot that matches the installation pedestal. An inner side surface of the upper positioning cover is provided with a plurality of insertion plates. A wall surface of the installation slot is penetrated to form a through hole that is disposed corresponding to the insertion plate. The installation pedestal is provided with a buckle plate that is disposed corresponding to the through hole. The buckle plate is penetrated to form an insertion hole that matches the insertion plate. Both sides of one end of the insertion plate are provided with an inverted buckle. The insertion plate is snap-fitted onto the insertion hole after passing through the through hole and the insertion hole sequentially.

Preferably, the installation pedestal includes an arc-shaped base plate, and an edge wrapping portion that is disposed as extending around a circumference of the arc-shaped base plate. The universal wheel is disposed at a bottom of the arc-shaped base plate. The buckle plate is disposed on a top surface of the arc-shaped base plate. A circumference of the installation slot is provided with a position-limiting groove that matches the edge wrapping portion. The edge wrapping portion is disposed on the position-limiting groove.

Preferably, the insertion plate includes a longitudinal connecting plate connected to the upper positioning cover, a longitudinal inserting plate connected to a side surface of the longitudinal connecting plate, and a plurality of transverse position-limiting plates that are disposed in parallel on both side surfaces of the longitudinal inserting plate. The inverted buckle is disposed on one end of the transverse position-limiting plate, and an inclined guiding surface is disposed on a top of one end of the longitudinal inserting plate.

The beneficial effects of the present invention are that: the present invention provides a structure for assembling a snap-type caster of a draw-bar case. When the caster is installed, firstly the upper positioning cover is combined onto the outer wall surface of the installation slot from the interior of the case body, so that each insertion plate of the upper positioning cover is inserted and installed into the corresponding through hole, and the installation pedestal is combined onto the installation slot while the upper positioning cover is pressed, so each insertion plate is snap-fitted onto the insertion hole of the corresponding buckle plate, thereby realizing the quick assembling of the caster, which can effectively reduce the difficulty of assembling the caster, improve the assembling efficiency, reduce manpower input and decrease production cost.

DETAILED DESCRIPTION OF THE PREFERRED EMBODIMENTS

In order to make the objectives, technical solutions and advantages of the embodiments of the present disclosure more clear, the technical solutions of the embodiments of the present disclosure will be described clearly and completely in connection with the accompanying drawings of the embodiments of the present disclosure. Obviously, the described embodiments are some, but not all, of the embodiments of the present disclosure.

Based on the described embodiments of the present disclosure, all other embodiments obtained by those of ordinary skills in the art without creative efforts fall within the claimed scope of the present disclosure.

Referring to FIGS. 1-7, the present invention provides a structure for assembling a snap-on caster of a draw-bar case, including a case body 10 and four caster assemblies 20. The caster assembly 20 includes a caster 21 and an upper positioning cover 22. The caster 21 includes an installation pedestal 210 and a universal wheel 23 disposed on the installation pedestal 210. Four sides of a bottom of the case body 10 are each provided with an installation slot 11 that matches the installation pedestal 210. An inner side surface of the upper positioning cover 22 is provided with a plurality of insertion plates 220. A wall surface of the installation slot 11 is penetrated to form a through hole 110 that is disposed corresponding to the insertion plate 220. The installation pedestal 210 is provided with a buckle plate 211 that is disposed corresponding to the through hole 110. The buckle plate 211 is penetrated to form an insertion hole 212 that matches the insertion plate 220. Both sides of one end of the insertion plate 220 are each provided with an inverted buckle 221. The insertion plate 220 is snap-fitted onto the insertion hole 212 after passing through the through hole 110 and the insertion hole 212 sequentially.

Its working principle is that when the caster 21 is installed onto the case body 10, firstly the upper positioning cover 22 is combined onto an outer wall surface of the installation slot 11 from an interior of the case body 10, so that each insertion plate 220 of the upper positioning cover 22 is inserted and installed into the corresponding through hole 110, and the installation pedestal 210 is combined onto the installation slot 11 while the upper positioning cover 22 is pressed, so each insertion plate 220 is snap-fitted onto the insertion hole 212 of the corresponding buckle plate 211, thereby realizing the quick assembling of the caster, which can effectively reduce the difficulty of assembling the caster, improve the assembling efficiency, reduce manpower input and decrease production cost.

Figure 1:
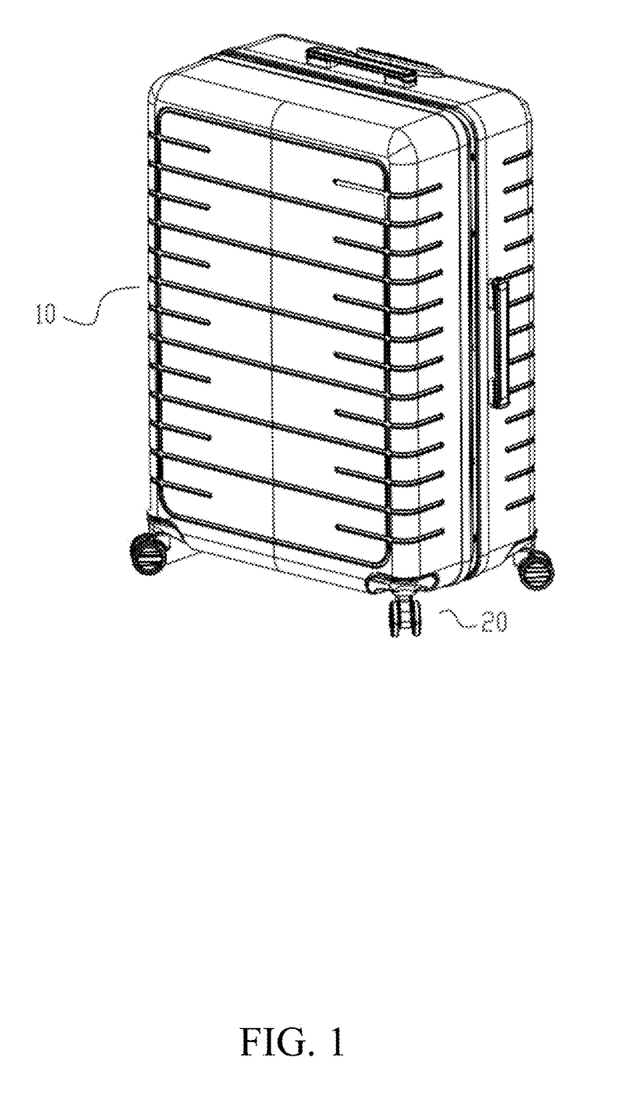
FIG. 1 illustrates a schematic diagram of the appearance structure of the present invention.
Figure 2:
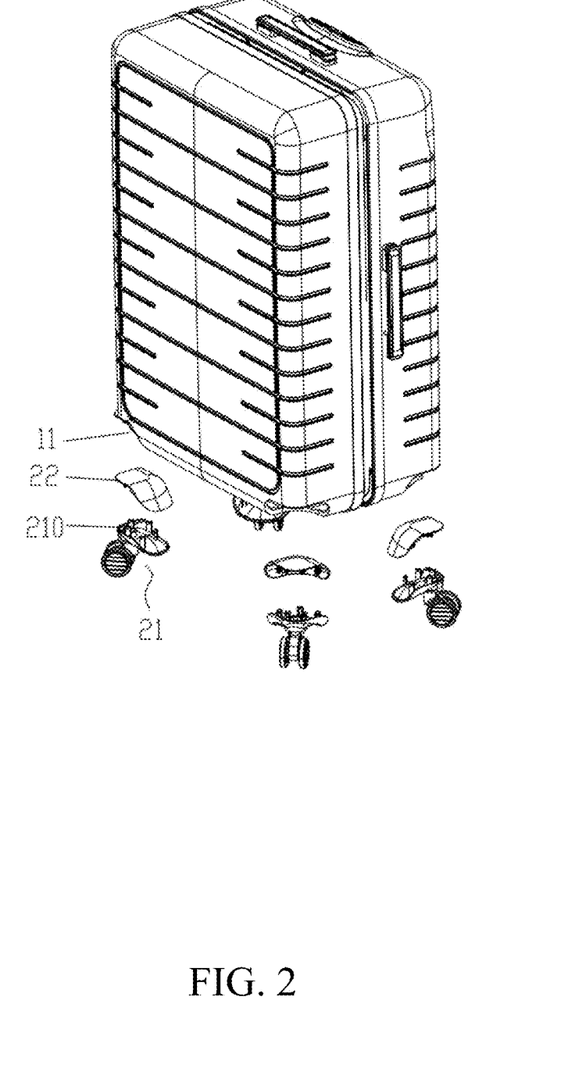
FIG. 2 illustrates a schematic exploded diagram of the structure of the present invention.
Figure 3:
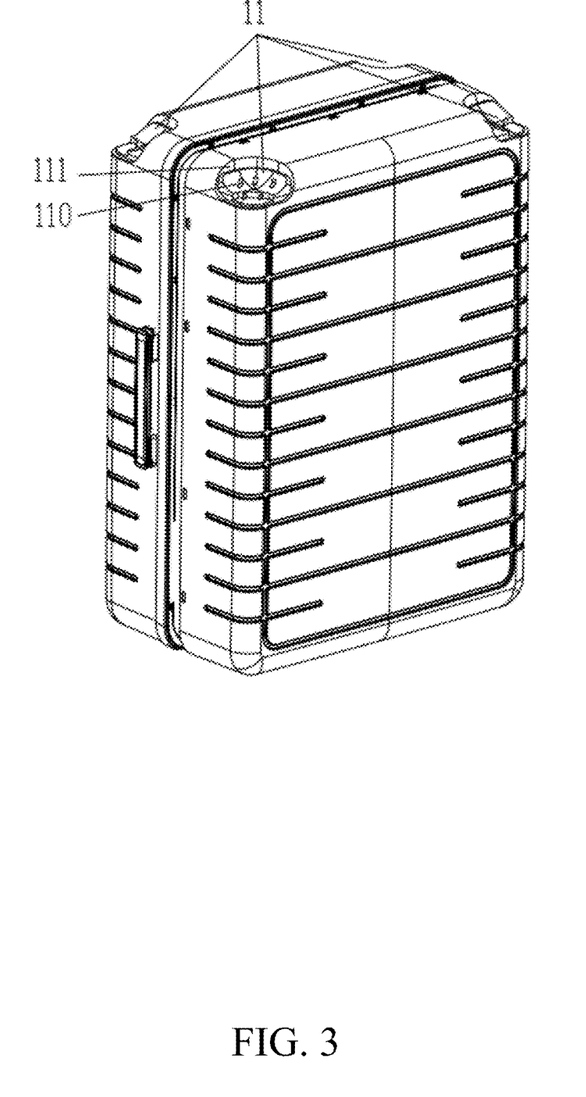
FIG. 3 illustrates a schematic structural diagram of a case body of the present invention.
Figure 4:
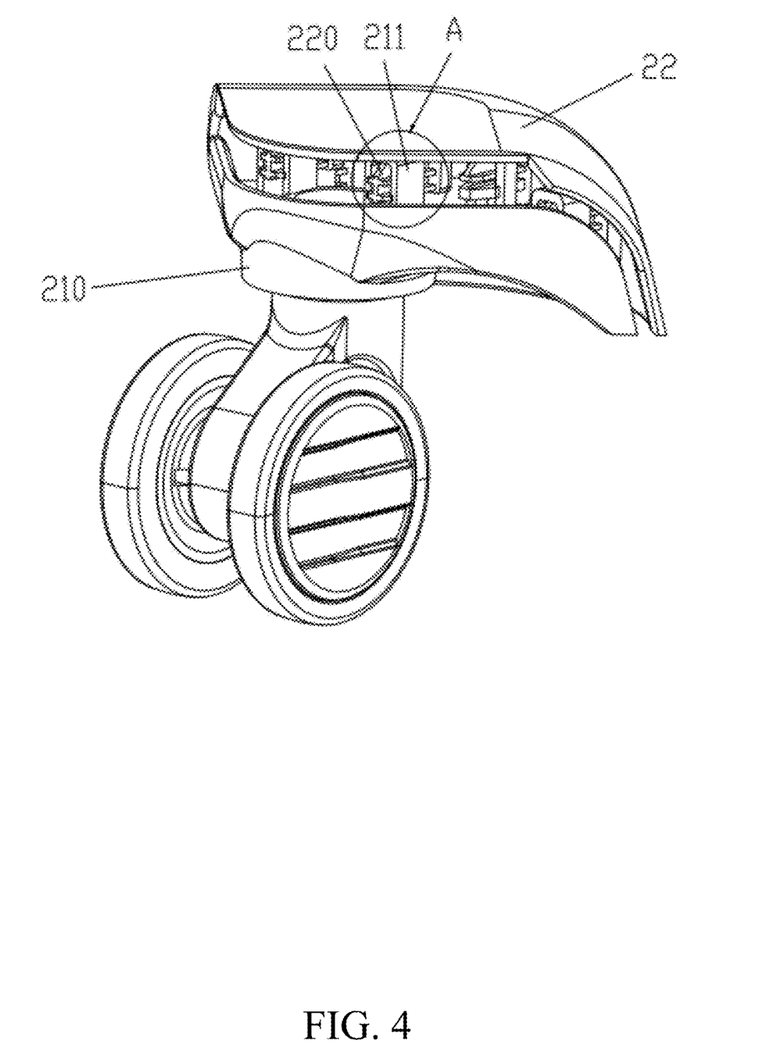
FIG. 4 illustrates a schematic diagram of an assembled structure of the casters and the upper positioning cover of the present invention.
Figure 5:
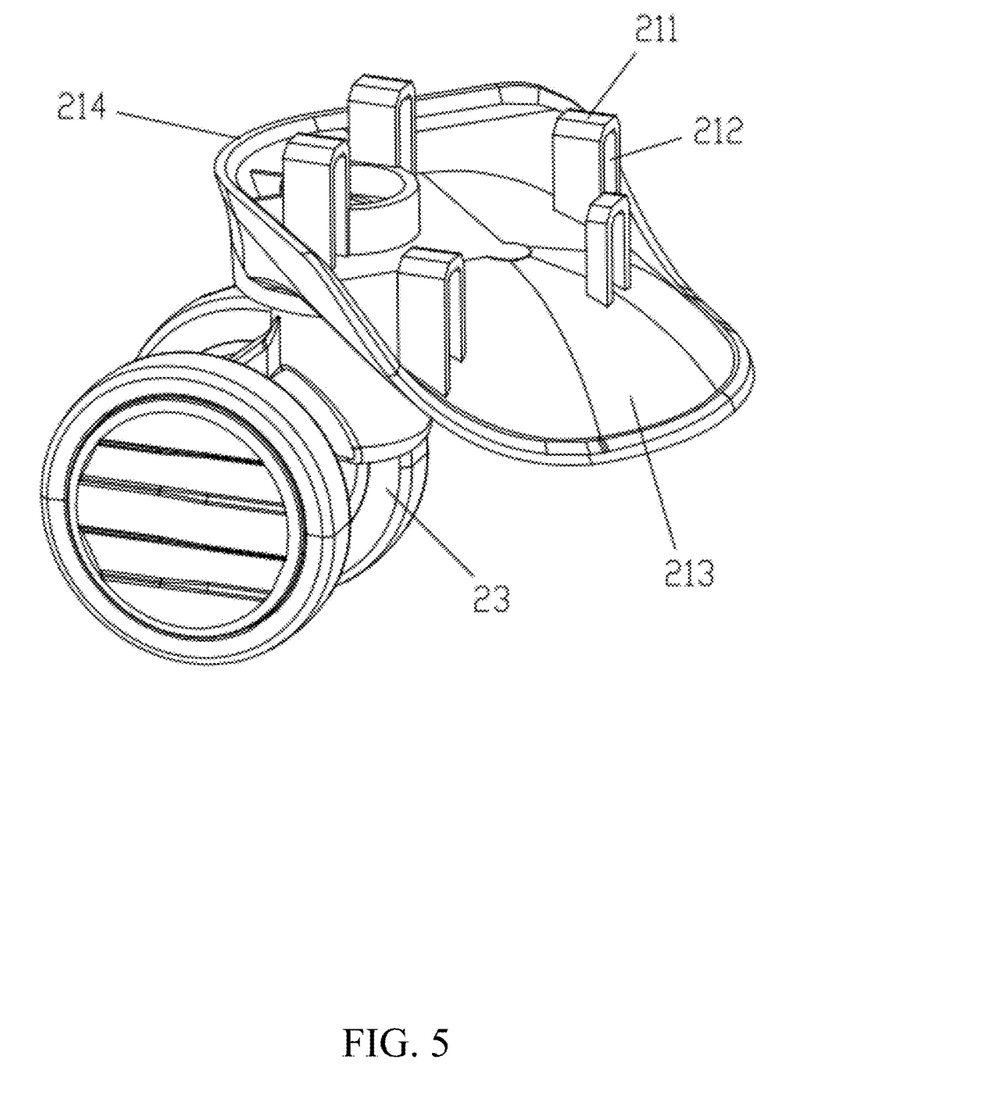
FIG. 5 illustrates a schematic structural diagram of a caster of the present invention.

Based on the aforementioned embodiments, the installation pedestal 210 includes an arc-shaped base plate 213, and an edge wrapping portion 214 that is disposed as extending around a circumference of the arc-shaped base plate 213. The universal wheel 23 is disposed at a bottom of the arc-shaped base plate 213. The buckle plate 211 is disposed on a top surface of the arc-shaped base plate 213. A circumference of the installation slot 11 is provided with a position-limiting groove 111 that matches the edge wrapping portion 214. The edge wrapping portion 214 is disposed on the position-limiting groove 111. After the installation pedestal 210 is assembled into the installation slot 11, the edge wrapping portion 214 is located on the position-limiting groove 111, which can improve the assembling stability of the installation pedestal 210.

Figure 6:
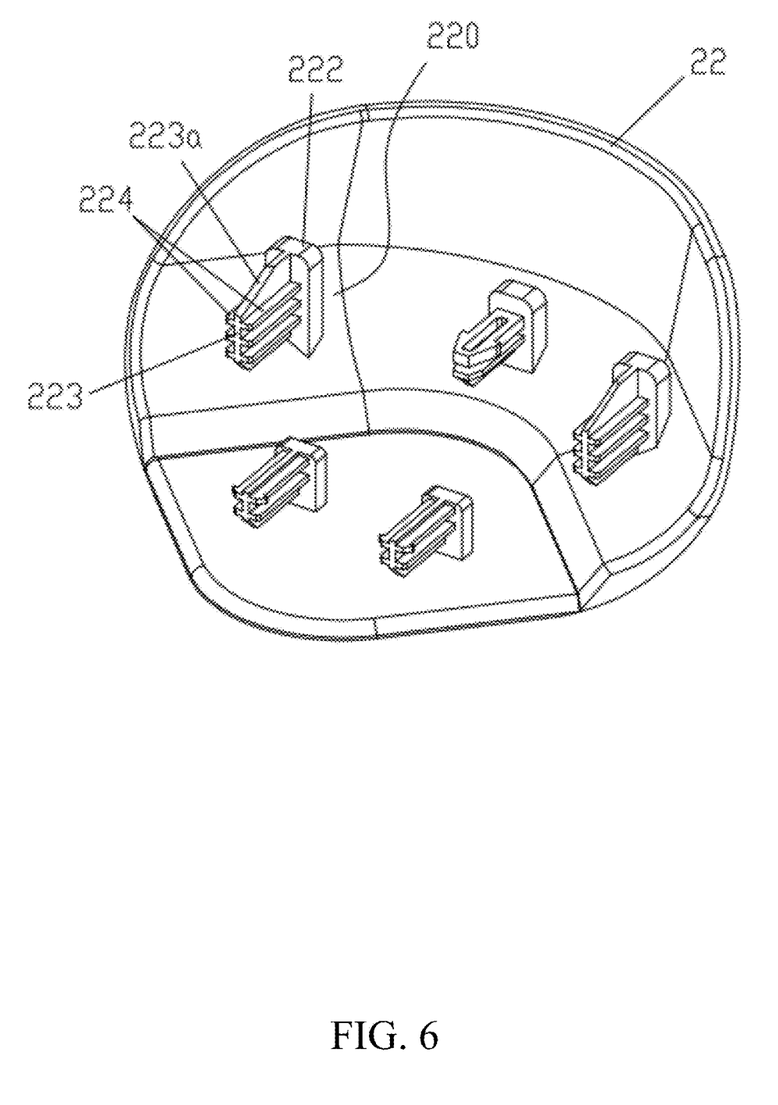
FIG. 6 illustrates a schematic structural diagram of the upper positioning cover of the present invention.
Figure 7:
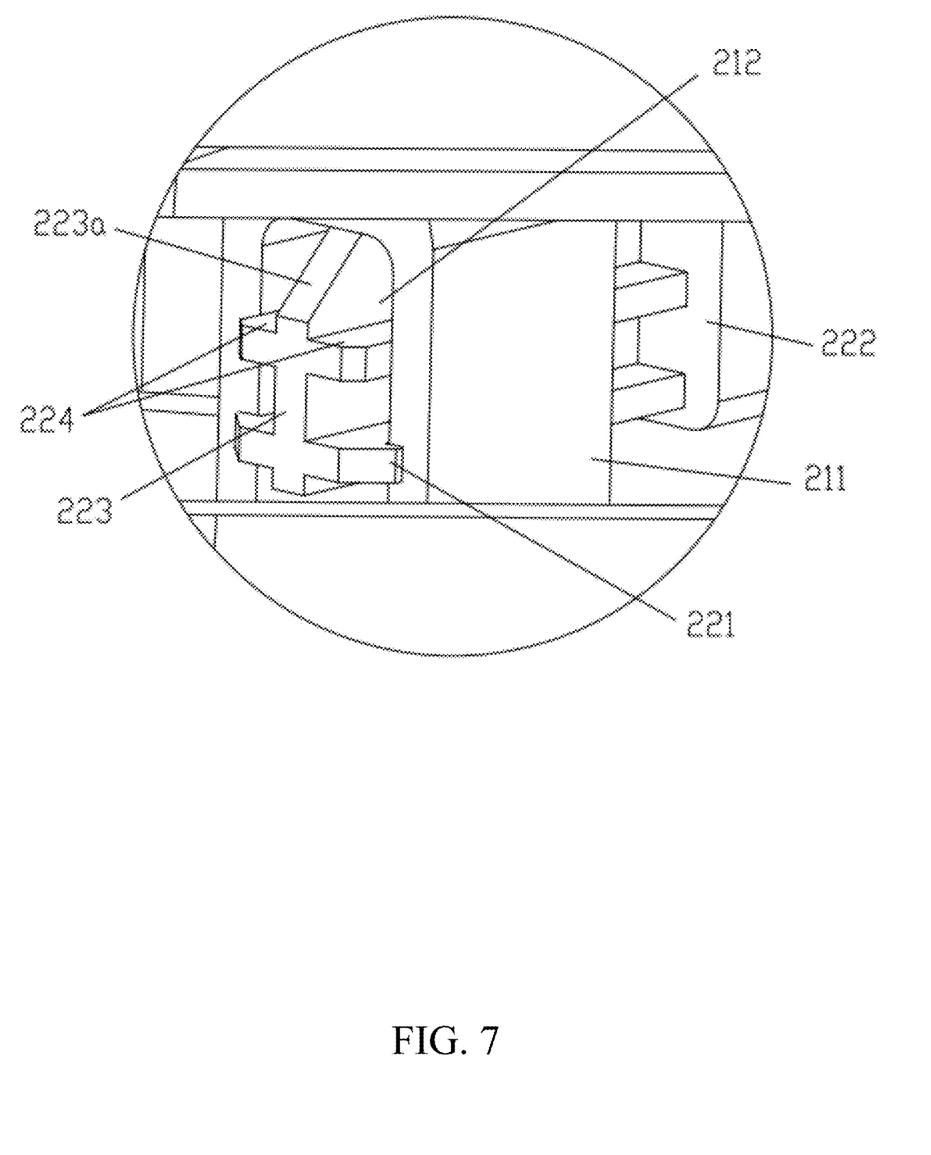
FIG. 7 illustrates a schematic partial enlarged structural diagram of part A in FIG. 4 of the present invention.

Based on the aforementioned embodiments, the insertion plate 220 includes a longitudinal connecting plate 222 connected to the upper positioning cover 22, a longitudinal inserting plate 223 connected to a side surface of the longitudinal connecting plate 222, and a plurality of transverse position-limiting plates 224 that are disposed in parallel on both side surfaces of the longitudinal inserting plate 223. The inverted buckle 221 is disposed on one end of the transverse position-limiting plate 224, and an inclined guiding surface 223a is disposed on a top of one end of the longitudinal inserting plate 223. Specifically, a distance between an outer end surfaces of two transverse position-limiting plates 224 matches a width of the insertion hole 212. When the installation pedestal 210 is assembled onto the installation slot 11, the insertion hole 212 on each buckle plate 211 is aligned with a corresponding insertion plate 220 and pushes the installation pedestal 210 horizontally toward a side of the installation slot 11. The transverse position-limiting plate 224 will move along a wall surface of the insertion hole 212, until the inverted buckle 221 completely runs through the insertion hole 212 and then the inverted buckle 221 is snap-fitted onto the insertion hole 212. The inclined guiding surface 223a plays a guiding role in a process when the insertion plate 220 is inserted into the insertion hole 212, which can ensure stable snap-fitting between the insertion plate 220 and the insertion hole 212.

The aforementioned embodiments are only descriptions of preferred embodiments of the present invention, and do not limit the scope of the present invention. Various variations and modifications made onto the technical solutions of the present invention by those of ordinary skills in the art without departing from the design spirit of the present invention, should all fall within the claimed scope determined by the claims of the present invention.

What is claimed is:

1. A structure for assembling a snap-on caster of a draw-bar case, comprising:
    a case body having, at each of four sides of a bottom thereof, an installation slot; and
    four caster assemblies, wherein
    each of the caster assemblies comprises a caster and an upper positioning cover, wherein the caster comprises an installation pedestal and a universal wheel disposed on the installation pedestal,
        the installation pedestal matches one of the four installation slots of the case body,
        an inner side surface of the upper positioning cover is provided with a plurality of insertion plates, and
        a wall surface of the one installation slot is penetrated to form a plurality of through holes that are disposed corresponding respectively to the plurality of insertion plates,
        the installation pedestal is provided with a plurality of buckle plates that are disposed corresponding respectively to the plurality of through holes,
        each of the plurality of buckle plates is penetrated to form the respective insertion hole that matches the respective insertion plate,
        each of the plurality of insertion plates has, at each of two sides of one end thereof an inverted buckle, and
        each of the plurality of buckle plates is snap-fitted onto the respective insertion hole after passing through the respective through hole and the respective insertion hole sequentially.

2. The structure for assembling a snap-on caster of a draw-bar case according to claim 1, wherein
    the installation pedestal comprises an arc-shaped base plate and an edge wrapping portion that is disposed as extending around a circumference of the arc-shaped base plate,
    the universal wheel is disposed at a bottom of the arc-shaped base plate,
    the buckle plate is disposed on a top surface of the arc-shaped base plate,
    a circumference of the installation slot is provided with a position-limiting groove that matches the edge wrapping portion, and
    the edge wrapping portion is disposed on the position-limiting groove.

3. The structure for assembling a snap-on caster of a draw-bar case according to claim 2, wherein
    each of the plurality of insertion plates comprises
        a longitudinal connecting plate connected to the upper positioning cover,
        a longitudinal inserting plate connected to a side surface of the longitudinal connecting plate, and
        a plurality of transverse position-limiting plates that are disposed in parallel on two side surfaces of the longitudinal inserting plate, wherein
    each of the inverted buckles is disposed on one end of each of the plurality of transverse position-limiting plates, and
    an inclined guiding surface is disposed on a top of one end of the longitudinal inserting plate.

* * * * *